United States Patent
Ichikawa et al.

(10) Patent No.: US 10,189,364 B2
(45) Date of Patent: Jan. 29, 2019

(54) NON-CONTACT ELECTRIC POWER TRANSMISSION SYSTEM, CHARGING STATION, AND VEHICLE

(71) Applicant: TOYOTA JIDOSHA KABUSHIKI KAISHA, Toyota-shi, Aichi-ken (JP)

(72) Inventors: Shinji Ichikawa, Toyota (JP); Satoshi Taniguchi, Toyota (JP); Shinpei Takita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 15/108,057

(22) PCT Filed: Nov. 12, 2014

(86) PCT No.: PCT/JP2014/005677
§ 371 (c)(1),
(2) Date: Jun. 24, 2016

(87) PCT Pub. No.: WO2015/097967
PCT Pub. Date: Jul. 2, 2015

(65) Prior Publication Data
US 2016/0318414 A1    Nov. 3, 2016

(30) Foreign Application Priority Data

Dec. 24, 2013  (JP) .................................. 2013-265618

(51) Int. Cl.
*B60L 11/18*  (2006.01)

(52) U.S. Cl.
CPC ....... *B60L 11/1829* (2013.01); *B60L 2230/16* (2013.01); *B60L 2230/40* (2013.01);
(Continued)

(58) Field of Classification Search
CPC .............. B60L 11/1829; B60L 2230/16; B60L 2230/40; Y02T 10/7005; Y02T 10/7072;
(Continued)

(56) References Cited

U.S. PATENT DOCUMENTS 5,821,731 A * 10/1998 Kuki ................... B60L 11/1805
320/108
7,741,734 B2    6/2010 Joannopoulos et al.
(Continued)

FOREIGN PATENT DOCUMENTS

AU    2006269374 B2    1/2007
AU    2006269374 C1    1/2007
(Continued)

*Primary Examiner* — Angelina Shudy
(74) *Attorney, Agent, or Firm* — Oliff PLC (57) ABSTRACT

A power source ECU transmits a first message for inquiring whether or not a vehicle is parked at a location provided with a power transmission device, after full-scale power transmission is completed. A vehicle ECU transmits a second message for informing that the vehicle is parked, when it receives the first message. When the power source ECU does not receive the second message for informing that the vehicle is parked after transmitting the first message, the power source ECU determines that the vehicle is not parked at the location provided with the power transmission device.

5 Claims, 9 Drawing Sheets

(52) U.S. Cl.
CPC ........ *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ..... Y02T 90/12; Y02T 90/121; Y02T 90/122; Y02T 90/125; Y02T 90/14
USPC .......................................................... 701/22
See application file for complete search history.

(56) References Cited

U.S. PATENT DOCUMENTS

| | | | | |
|---|---|---|---|---|
| 8,143,745 | B2* | 3/2012 | Shiozaki | H02J 7/025 307/104 |
| 8,339,097 | B2* | 12/2012 | Kojima | H02J 50/80 320/108 |
| 8,525,473 | B2* | 9/2013 | Shimizu | B60L 11/1816 320/109 |
| 9,090,173 | B2* | 7/2015 | Oishi | B60L 11/182 |
| 9,221,352 | B2* | 12/2015 | Oishi | B60L 11/182 |
| 9,254,756 | B2* | 2/2016 | Miwa | G06Q 30/04 |
| 9,358,940 | B2* | 6/2016 | Cooper | B60R 16/037 |
| 9,446,674 | B2* | 9/2016 | Halker | B60L 11/1827 |
| 9,592,741 | B2* | 3/2017 | Oishi | H02J 7/0052 |
| 9,623,759 | B2* | 4/2017 | Ichikawa | B60L 11/1827 |
| 9,649,947 | B2* | 5/2017 | Ichikawa | H02J 7/025 |
| 9,834,103 | B2* | 12/2017 | Ichikawa | B60L 11/182 |
| 10,023,058 | B2* | 7/2018 | Ichikawa | H02J 7/025 |
| 2007/0222542 | A1 | 9/2007 | Joannopoulos et al. | |
| 2008/0278264 | A1 | 11/2008 | Karalis et al. | |
| 2009/0195332 | A1 | 8/2009 | Joannopoulos et al. | |
| 2009/0195333 | A1 | 8/2009 | Joannopoulos et al. | |
| 2009/0224856 | A1 | 9/2009 | Karalis et al. | |
| 2009/0267709 | A1 | 10/2009 | Joannopoulos et al. | |
| 2009/0267710 | A1 | 10/2009 | Joannopoulos et al. | |
| 2010/0013436 | A1* | 1/2010 | Lowenthal | G06Q 30/04 320/109 |
| 2010/0096934 | A1 | 4/2010 | Joannopoulos et al. | |
| 2010/0102639 | A1 | 4/2010 | Joannopoulos et al. | |
| 2010/0102640 | A1 | 4/2010 | Joannopoulos et al. | |
| 2010/0102641 | A1 | 4/2010 | Joannopoulos et al. | |
| 2010/0117455 | A1 | 5/2010 | Joannopoulos et al. | |
| 2010/0117456 | A1 | 5/2010 | Karalis et al. | |
| 2010/0123353 | A1 | 5/2010 | Joannopoulos et al. | |
| 2010/0123354 | A1 | 5/2010 | Joannopoulos et al. | |
| 2010/0123355 | A1 | 5/2010 | Joannopoulos et al. | |
| 2010/0127573 | A1 | 5/2010 | Joannopoulos et al. | |
| 2010/0127574 | A1 | 5/2010 | Joannopoulos et al. | |
| 2010/0127575 | A1 | 5/2010 | Joannopoulos et al. | |
| 2010/0133918 | A1 | 6/2010 | Joannopoulos et al. | |
| 2010/0133919 | A1 | 6/2010 | Joannopoulos et al. | |
| 2010/0133920 | A1 | 6/2010 | Joannopoulos et al. | |
| 2010/0161216 | A1* | 6/2010 | Yamamoto | B60L 11/182 701/408 |
| 2010/0171370 | A1 | 7/2010 | Karalis et al. | |
| 2010/0181844 | A1 | 7/2010 | Karalis et al. | |
| 2010/0187911 | A1 | 7/2010 | Joannopoulos et al. | |
| 2010/0201205 | A1 | 8/2010 | Karalis et al. | |
| 2010/0207458 | A1 | 8/2010 | Joannopoulos et al. | |
| 2010/0225175 | A1 | 9/2010 | Karalis et al. | |
| 2010/0231053 | A1 | 9/2010 | Karalis et al. | |
| 2010/0237706 | A1 | 9/2010 | Karalis et al. | |
| 2010/0237707 | A1 | 9/2010 | Karalis et al. | |
| 2010/0237708 | A1 | 9/2010 | Karalis et al. | |
| 2010/0253152 | A1 | 10/2010 | Karalis et al. | |
| 2010/0264745 | A1 | 10/2010 | Karalis et al. | |
| 2011/0010281 | A1 | 1/2011 | Wass | |
| 2011/0010300 | A1* | 1/2011 | Audet | G06Q 10/06 705/307 |
| 2012/0229085 | A1* | 9/2012 | Lau | B60L 11/1818 320/109 |
| 2012/0242288 | A1* | 9/2012 | Birke | B60L 11/1809 320/109 |
| 2013/0038272 | A1* | 2/2013 | Sagata | B60L 11/182 320/106 |
| 2013/0127409 | A1 | 5/2013 | Ichikawa | |
| 2013/0193749 | A1 | 8/2013 | Nakamura et al. | |
| 2013/0200718 | A1* | 8/2013 | Ogawa | B60L 5/005 307/104 |
| 2014/0035522 | A1* | 2/2014 | Oishi | B60L 11/182 320/108 |
| 2014/0035526 | A1* | 2/2014 | Tripathi | B60L 11/1838 320/109 |
| 2014/0074332 | A1* | 3/2014 | Ichikawa | B60L 11/1846 701/22 |
| 2014/0292270 | A1* | 10/2014 | Ichikawa | B60L 7/14 320/108 |
| 2014/0333128 | A1* | 11/2014 | Ichikawa | H02J 7/025 307/9.1 |
| 2014/0368166 | A1* | 12/2014 | Oishi | B60L 11/182 320/108 |
| 2015/0008877 | A1 | 1/2015 | Ichikawa et al. | |
| 2015/0149221 | A1* | 5/2015 | Tremblay | B60L 11/1846 705/5 |
| 2015/0202971 | A1* | 7/2015 | Taniguchi | B60L 11/182 320/108 |
| 2015/0217648 | A1* | 8/2015 | Ichikawa | H02J 7/025 320/108 |
| 2015/0217650 | A1* | 8/2015 | Ichikawa | B60L 11/1825 320/108 |
| 2015/0239354 | A1* | 8/2015 | Gorai | B60L 3/00 307/10.1 |
| 2016/0273927 | A1* | 9/2016 | Kitajima | G01C 21/3415 |
| 2016/0297314 | A1* | 10/2016 | Iwai | H02J 7/0027 |
| 2016/0311337 | A1* | 10/2016 | Ichikawa | H02J 5/005 |
| 2016/0325632 | A1* | 11/2016 | Ichikawa | B60L 11/005 |
| 2017/0120765 | A1* | 5/2017 | Ichikawa | B60L 11/1825 |
| 2017/0144557 | A1* | 5/2017 | Werner | B60L 11/1818 |
| 2017/0182905 | A1* | 6/2017 | Lowenthal | B60L 11/1848 |
| 2017/0203664 | A1* | 7/2017 | Lowenthal | B60L 11/1842 |
| 2017/0210232 | A1* | 7/2017 | Ichikawa | H02J 7/025 |
| 2017/0253131 | A1* | 9/2017 | Kilic | B60L 11/1846 |
| 2017/0268892 | A1* | 9/2017 | Singh | G01C 21/3423 |
| 2017/0282740 | A1* | 10/2017 | Ichikawa | B60L 11/02 |
| 2018/0029482 | A1* | 2/2018 | Ichikawa | H02J 7/025 |
| 2018/0043879 | A1* | 2/2018 | Ichikawa | B60W 20/15 |
| 2018/0072177 | A1* | 3/2018 | Tremblay | G06Q 50/12 |
| 2018/0093570 | A1* | 4/2018 | Ichikawa | H02J 50/12 |

FOREIGN PATENT DOCUMENTS

| | | | |
|---|---|---|---|
| AU | 2007349874 A2 | 10/2008 | |
| AU | 2010200044 A1 | 1/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| EP | 2 557 652 A1 | 2/2013 | |
| IN | 735/DELNP/2008 | 5/2008 | |
| IN | 6195/DELNP/2009 | 7/2010 | |
| JP | 2009-501510 A | 1/2009 | |
| JP | 2010-152657 A | 7/2010 | |
| JP | 2010-252498 A | 11/2010 | |
| JP | 2011-018336 A | 1/2011 | |
| JP | 2011-223657 A | 11/2011 | |
| JP | 2011223657 A * | 11/2011 | ............. B60L 5/005 |
| JP | 2012-093938 A | 5/2012 | |
| JP | 2013-110822 A | 6/2013 | |
| JP | 2013-126327 A | 6/2013 | |
| JP | 2013-146148 A | 7/2013 | |
| JP | 2013-146154 A | 7/2013 | |
| JP | 2013-154815 A | 8/2013 | |
| JP | 5329660 B2 | 10/2013 | |
| JP | 2013-233027 A | 11/2013 | |
| JP | 2013-247796 A | 12/2013 | |
| KR | 2008-0031398 A | 4/2008 | |
| KR | 2010-0015954 A | 2/2010 | |
| WO | 2007/008646 A2 | 1/2007 | |

(56) References Cited

FOREIGN PATENT DOCUMENTS

| WO | 2008/118178 A1 | 10/2008 |
|----|----------------|---------|
| WO | 2010/006078 A1 | 1/2010  |
| WO | 2012/086048 A1 | 6/2012  |

\* cited by examiner

NON-CONTACT ELECTRIC POWER TRANSMISSION SYSTEM, CHARGING STATION, AND VEHICLE

TECHNICAL FIELD

The present invention relates to a non-contact electric power transmission system, a charging station, and a vehicle.

BACKGROUND ART

Japanese Patent No. 5329660 (PTL 1) discloses a system transmitting electric power in a non-contact manner between a power reception device mounted in a vehicle and a power transmission device provided to a charging station. In this system, alignment between a coil included in the power transmission device and a coil included in the power reception device, transmission of full-scale electric power, and the like are performed by transmitting various types of information between the charging station and the vehicle when the electric power is transmitted.

CITATION LIST

Patent Literature

[PTL 1] Japanese Patent No. 5329660
[PTL 2] Japanese Patent Laying-Open No. 2010-252498
[PTL 3] Japanese Patent Laying-Open No. 2013-154815
[PTL 4] Japanese Patent Laying-Open No. 2013-146154
[PTL 5] Japanese Patent Laying-Open No. 2013-146148
[PTL 6] Japanese Patent Laying-Open No. 2013-110822
[PTL 7] Japanese Patent Laying-Open No. 2013-126327

SUMMARY OF INVENTION

Technical Problem

However, in the system described in Japanese Patent No. 5329660 (PTL 1), the charging station cannot determine whether or not there is a vacant power transmission device.

Accordingly, one object of the present invention is to provide a non-contact electric power transmission system in which a charging station can determine whether or not there is a vacant power transmission device, the charging station, and a vehicle.

Solution to Problem

To solve the above problem, the present invention is directed to a non-contact electric power transmission system transmitting electric power between a vehicle and a charging station in a non-contact manner. The charging station includes a power transmission device transmitting the electric power in the non-contact manner, and a station control unit transmitting a first message for inquiring whether or not the vehicle is parked at a location provided with the power transmission device, after charging is completed. The vehicle includes a power reception device receiving the electric power in the non-contact manner, and a vehicle control unit transmitting a second message for informing that the vehicle is parked, when receiving the first message. When the station control unit does not receive the second message for informing that the vehicle is parked after transmitting the first message, the station control unit determines that the vehicle is not parked at the location provided with the power transmission device.

Thereby, when the charging station does not receive the second message after transmitting the first message, the charging station can determine that there is a vacant power transmission device.

Preferably, when the station control unit does not receive the second message, the station control unit transmits a third message informing that charging at the charging station is possible.

Thereby, the vehicle can be appropriately guided to the charging station.

Preferably, the charging station includes a plurality of power transmission devices. When alignment between one of the plurality of power transmission devices and the power reception device is completed, the vehicle control unit performs pairing processing between itself and the charging station, the pairing processing being performed for causing the charging station to specify with which of the plurality of power transmission devices the power reception device is aligned. The vehicle control unit receives information for specifying the power transmission device with which the alignment is performed, from the charging station, after the pairing processing is completed. The second message includes the received information for specifying the power transmission device, and information indicating that the vehicle is parked.

Thereby, the charging station can determine which of the plurality of power transmission devices is vacant.

Preferably, in the pairing processing, the plurality of power transmission devices respectively transmit electric power for transmission times different from each other during a predetermined period, and the vehicle control unit transmits a signal indicating a time for which the power reception device receives the electric power.

Thereby, pairing can be reliably performed.

Preferably, the station control unit determines, for each of the plurality of power transmission devices, that the vehicle is parked, from after completion of pairing to when the station control unit determines that the station control unit does not receive the second message, and when the station control unit determines, for all of the plurality of power transmission devices, that the vehicle is parked, the station control unit transmits a fourth message for informing that charging is impossible because the charging station is full.

Thereby, the vehicle can be appropriately guided to the charging station.

The present invention is directed to a non-contact electric power transmission system transmitting electric power between a vehicle and a charging station in a non-contact manner. The charging station includes a power transmission device transmitting the electric power in the non-contact manner. The vehicle includes a power reception device receiving the electric power in the non-contact manner, and a vehicle control unit transmitting a fifth message for informing that the vehicle is not parked, when the vehicle leaves a location provided with the power transmission device, after full-scale power reception is completed. The charging station further includes a station control unit determining that the vehicle is not parked at the location provided with the power transmission device, when receiving the fifth message.

Thereby, the charging station can determine that there is a vacant power transmission device, by receiving the fifth message for informing that the vehicle is not parked.

Preferably, the vehicle control unit transmits the fifth message when the vehicle is set by a driver to be travelable and thereafter a shift range thereof is switched to a shift range other than a P range.

Thereby, the fifth message informing leaving of the vehicle can be transmitted when the shift range is switched from the P range to a range for allowing the vehicle to leave.

The present invention is directed to a charging station transmitting electric power to a power reception device of a vehicle in a non-contact manner, including a power transmission device transmitting the electric power in the non-contact manner, and a control unit transmitting a first message for inquiring whether or not the vehicle is parked at a location provided with the power transmission device, after charging is completed. When the control unit does not receive a second message for informing that the vehicle is parked, from the vehicle, after transmitting the first message, the control unit determines that the vehicle is not parked at the location provided with the power transmission device.

Thereby, when the charging station does not receive the second message after transmitting the first message, the charging station can determine that there is a vacant power transmission device.

Preferably, provided is a vehicle receiving electric power from a power transmission device provided to a charging station in a non-contact manner, including a power reception device receiving the electric power in the non-contact manner, and a control unit transmitting, when receiving a first message for inquiring whether or not the vehicle is parked at a location provided with the power transmission device, from the charging station, after charging is completed, a second message for informing that the vehicle is parked.

Thereby, when the vehicle receives the first message, the vehicle transmits the second message for informing that the vehicle is parked. Consequently, when the charging station does not receive the second message after transmitting the first message, the charging station can determine that there is a vacant power transmission device.

Advantageous Effects of Invention

According to the present invention, the charging station can determine whether or not there is a vacant power transmission device.

DESCRIPTION OF EMBODIMENTS

Hereinafter, embodiments of the present invention will be described with reference to the drawings.

First Embodiment (Configuration of Non-Contact Electric Power Transmission System)

Figure 1:
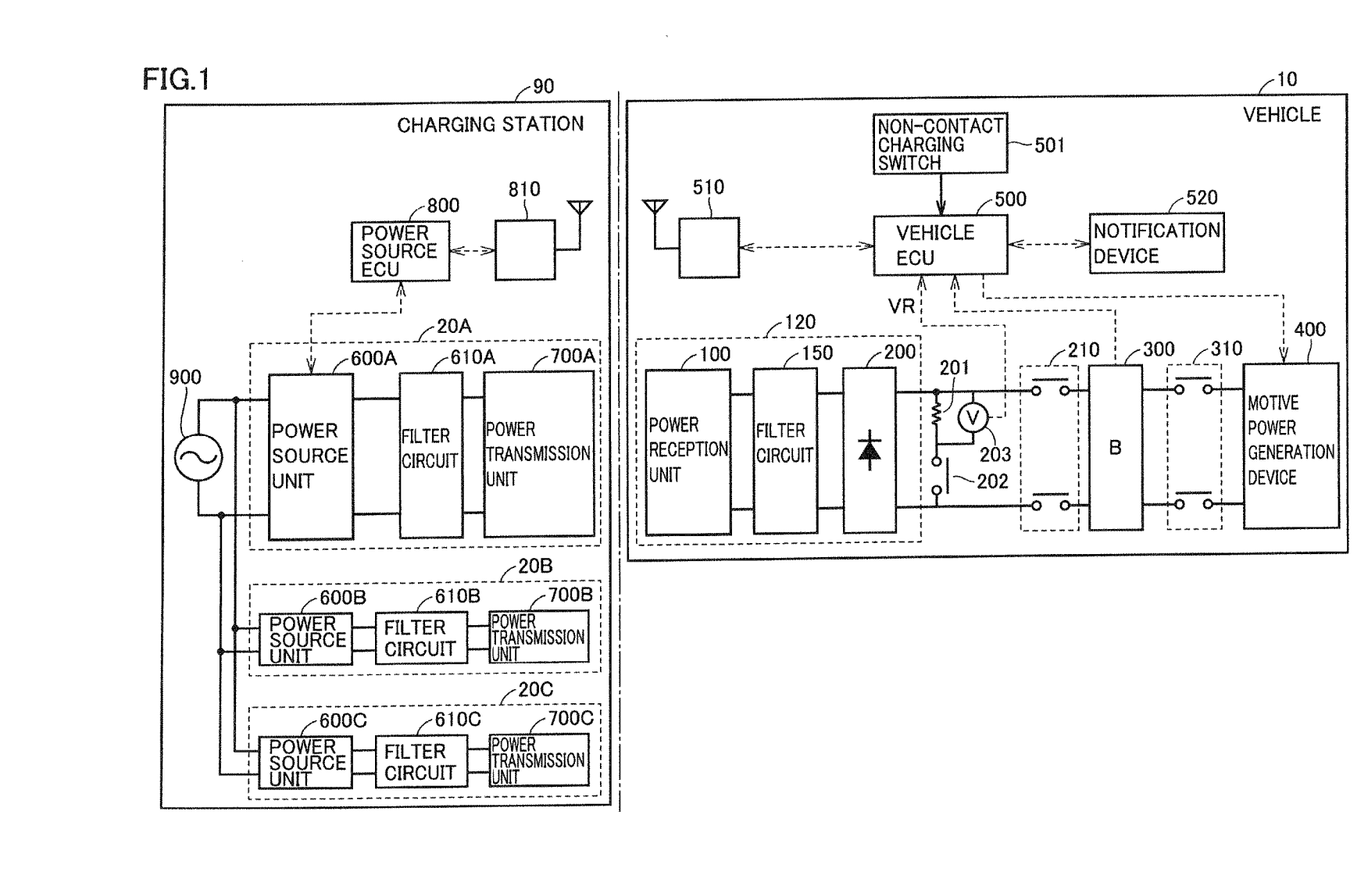
FIG. 1 is an overall configuration diagram of a non-contact electric power transmission system as an exemplary embodiment of the present invention.

FIG. 1 is an overall configuration diagram of a non-contact electric power transmission system as an exemplary embodiment of the present invention.

Referring to FIG. 1, the non-contact electric power transmission system in accordance with the present embodiment is composed of a vehicle 10 equipped with a power reception device 120 configured to be able to receive electric power in a non-contact manner, and a charging station 90 provided with power transmission devices 20A, 20B, 20C transmitting electric power from outside the vehicle to a power reception unit 100.

Details of specific configurations of vehicle 10 and charging station 90 will be further described below.

Vehicle 10 includes power reception device 120, a power storage device 300, a motive power generation device 400, a communication device 510, a vehicle ECU 500, and a notification device 520. Power reception device 120 includes power reception unit 100, a filter circuit 150, and a rectification unit 200.

Charging station 90 includes an external power source 900, power transmission devices 20A, 20B, 20C, a communication device 810, and a power source ECU 800. Power transmission devices 20A, 20B, 20C include power source units 600A, 600B, 600C, filter circuits 610A, 610B, 610C, and power transmission units 700A, 700B, 700C, respectively.

Figure 2:
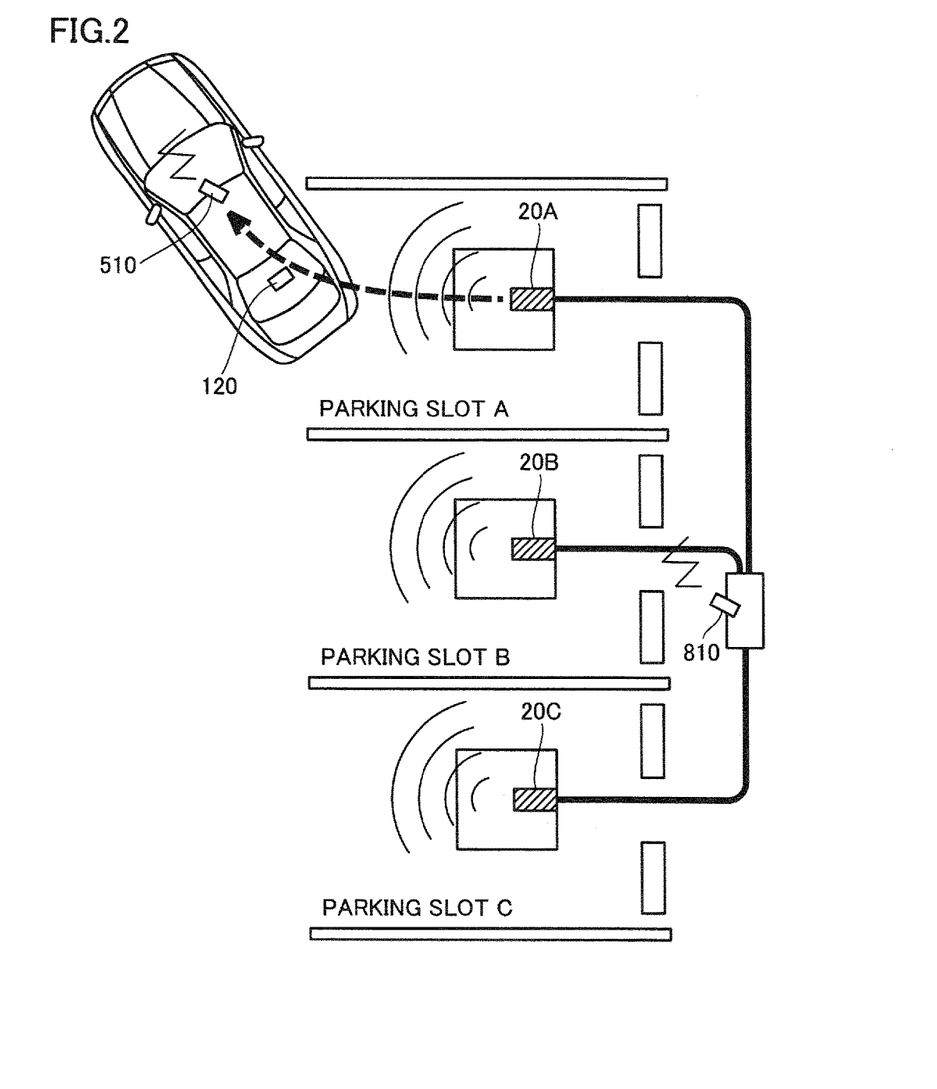
FIG. 2 is a view for describing a manner in which a vehicle is being parked in a parking slot within a charging station.

For example, as shown in FIG. 2, power transmission devices 20A, 20B, 20C are provided on or in the ground in parking slots A, B, C, respectively, and power reception device 120 is arranged at a lower portion of a vehicle body. The position where power reception device 120 is arranged is not limited thereto. For example, if power transmission devices 20A, 20B, 20C are provided above vehicle 10, power reception device 120 may be provided at an upper portion of the vehicle body.

Power reception unit 100 includes a secondary coil for receiving (alternating current (AC)) power output from any of power transmission units 700A, 700B, 700C of power transmission devices 20A, 20B, 20C, in the non-contact manner. Power reception unit 100 outputs the received power to rectification unit 200. Rectification unit 200 rectifies the AC power received by power reception unit 100, and outputs it to power storage device 300. Filter circuit 150 is provided between power reception unit 100 and rectification unit 200 to suppress harmonic noise generated when the power is received from any of power transmission units 700A, 700B, 700C. Filter circuit 150 is composed of, for example, an LC filter including an inductor and a capacitor.

Power storage device 300 is a rechargeable direct current (DC) power source, and is composed of, for example, a secondary battery such as a lithium ion battery or a nickel hydride battery. Power storage device 300 has a voltage of, for example, about 200 V. Power storage device 300 stores the power output from rectification unit 200, and also stores electric power generated by motive power generation device 400. Then, power storage device 300 supplies the stored power to motive power generation device 400. It is noted that a large-capacity capacitor may also be adopted as power storage device 300. Although not particularly shown, a DC-DC converter adjusting an output voltage of rectification unit 200 may be provided between rectification unit 200 and power storage device 300.

Motive power generation device 400 generates a travel driving force for vehicle 10 using the power stored in power storage device 300. Although not particularly shown, motive power generation device 400 includes, for example, an inverter receiving the power from power storage device 300, a motor driven by the inverter, drive wheels driven by the motor, and the like. It is noted that motive power generation device 400 may include a power generator for charging power storage device 300, and an engine which can drive the power generator.

Vehicle ECU 500 includes a CPU (Central Processing Unit), a storage device, an input/output buffer, and the like (all not shown). Vehicle ECU 500 receives signals from various sensors, outputs a control signal to each apparatus, and controls each apparatus in vehicle 10. As an example, vehicle ECU 500 performs travel control of vehicle 10 and charging control of power storage device 300. These controls are not necessarily processed by software, and can also be processed by exclusive hardware (electronic circuitry).

It is noted that a relay 210 is provided between rectification unit 200 and power storage device 300. Relay 210 is turned on by vehicle ECU 500 when power storage device 300 is charged by power transmission device 20A, 20B, 20C. Further, a system main relay (SMR) 310 is provided between power storage device 300 and motive power generation device 400. SMR 310 is turned on by vehicle ECU 500 when activation of motive power generation device 400 is requested.

Furthermore, a relay 202 is provided between rectification unit 200 and relay 210. A voltage VR across a resistor 201 connected in series with relay 202 is detected by a voltage sensor 203, and is transmitted to vehicle ECU 500.

When power storage device 300 is charged by power transmission device 20A, 20B, 20C, vehicle ECU 500 communicates with communication device 810 of charging station 90 using communication device 510, to exchange information such as start/stop of charging and a power reception status of vehicle 10 with power source ECU 800.

FIG. 2 is a view for describing a manner in which vehicle 10 is being moved to perform alignment between power reception device 120 and power transmission device 20A. Referring to FIG. 2, vehicle 10 or charging station 90 determines whether the secondary coil within power reception device 120 is aligned with a primary coil within power transmission device 20A, based on a vehicle-mounted camera not shown, intensity of power received when power transmission unit 700A performs test power transmission (i.e., transmission of weak power), or the like, and notification device 520 notifies a driver of the determination. The driver moves vehicle 10 such that the positional relation between power reception device 120 and power transmission device 20A becomes satisfactory for power transmission and reception, based on the information obtained from notification device 520. It is noted that the driver does not necessarily have to operate a steering wheel or an accelerator, and vehicle 10 may automatically move and align its position, and the driver may watch the manner vehicle 10 through notification device 520.

Referring to FIG. 1 again, power source units 600A, 600B, 600C receive electric power from external power source 900 such as a commercial system power source, and generate AC power having a predetermined transmission frequency.

Power transmission units 700A, 700B, 700C each include a primary coil for transmitting electric power to power reception unit 100 in the non-contact manner. Power transmission units 700A, 700B, 700C receive the AC power having the transmission frequency from power source units 600A, 600B, 600C, and transmit the power to power reception unit 100 of vehicle 10 in the non-contact manner via electromagnetic fields generated around power transmission units 700A, 700B, 700C.

Filter circuits 610A, 610B, 610C are provided between power source units 600A, 600B, 600C and power transmission units 700A, 700B, 700C, respectively, to suppress harmonic noise generated from power source units 600A, 600B, 600C. Filter circuits 610A, 610B, 610C are each composed of an LC filter including an inductor and a capacitor.

Power source ECU 800 includes a CPU, a storage device, an input/output buffer, and the like (all not shown). Power source ECU 800 receives signals from various sensors, outputs a control signal to each apparatus, and controls each apparatus in charging station 90. As an example, power source ECU 800 performs switching control of power source units 600A, 600B, 600C such that power source units 600A, 600B, 600C generate the AC power having the transmission frequency. These controls are not necessarily processed by software, and can also be processed by exclusive hardware (electronic circuitry).

It is noted that, when the power is transmitted to vehicle 10, power source ECU 800 communicates with communication device 510 of vehicle 10 using communication device 810, to exchange the information such as start/stop of charging and the power reception status of vehicle 10 with vehicle 10.

The AC power having the predetermined transmission frequency is supplied from power source units 600A, 600B, 600C, via filter circuits 610A, 610B, 610C, to power transmission unit 700A, 700B, 700C, respectively. Power transmission units 700A, 700B, 700C, and power reception unit 100 of vehicle 10 each include a coil and a capacitor, and are designed to resonate at the transmission frequency. Preferably, a Q value indicating the resonance intensity of power transmission units 700A, 700B, 700C and power reception unit 100 is more than or equal to 100.

When the AC power is supplied from power source units 600A, 600B, 600C, via filter circuits 610A, 610B, 610C, to power transmission unit 700A, 700B, 700C, respectively, energy (electric power) is moved from any of power transmission units 700A, 700B, 700C to power reception unit 100, via an electromagnetic field formed between the primary coil included in any of power transmission units 700A, 700B, 700C and the secondary coil of power reception unit 100. Then, the energy (electric power) moved to power reception unit 100 is supplied to power storage device 300 via filter circuit 150 and rectification unit 200.

Although not particularly shown, in power transmission devices 20A, 20B, 20C, insulation transformers may be provided between power transmission units 700A, 700B, 700C and power source units 600A, 600B, 600C (for example, between power transmission units 700A, 700B,

700C and filter circuits 610A, 610B, 610C). Further, also in vehicle 10, an insulation transformer may be provided between power reception unit 100 and rectification unit 200 (for example, between power reception unit 100 and filter circuit 150).

(Procedure for Non-Contact Electric Power Transmission)

Figure 3:
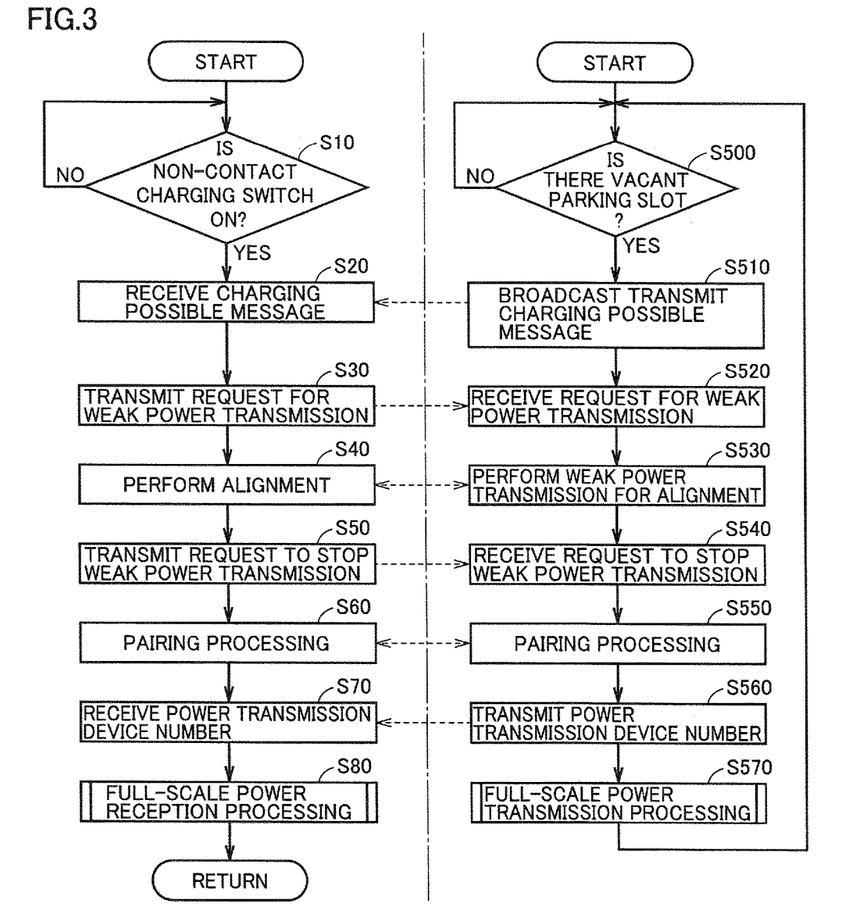
FIG. 3 is a flowchart for describing an outline of processing performed by the vehicle and the charging station when non-contact electric power transmission is performed.
Figure 4:
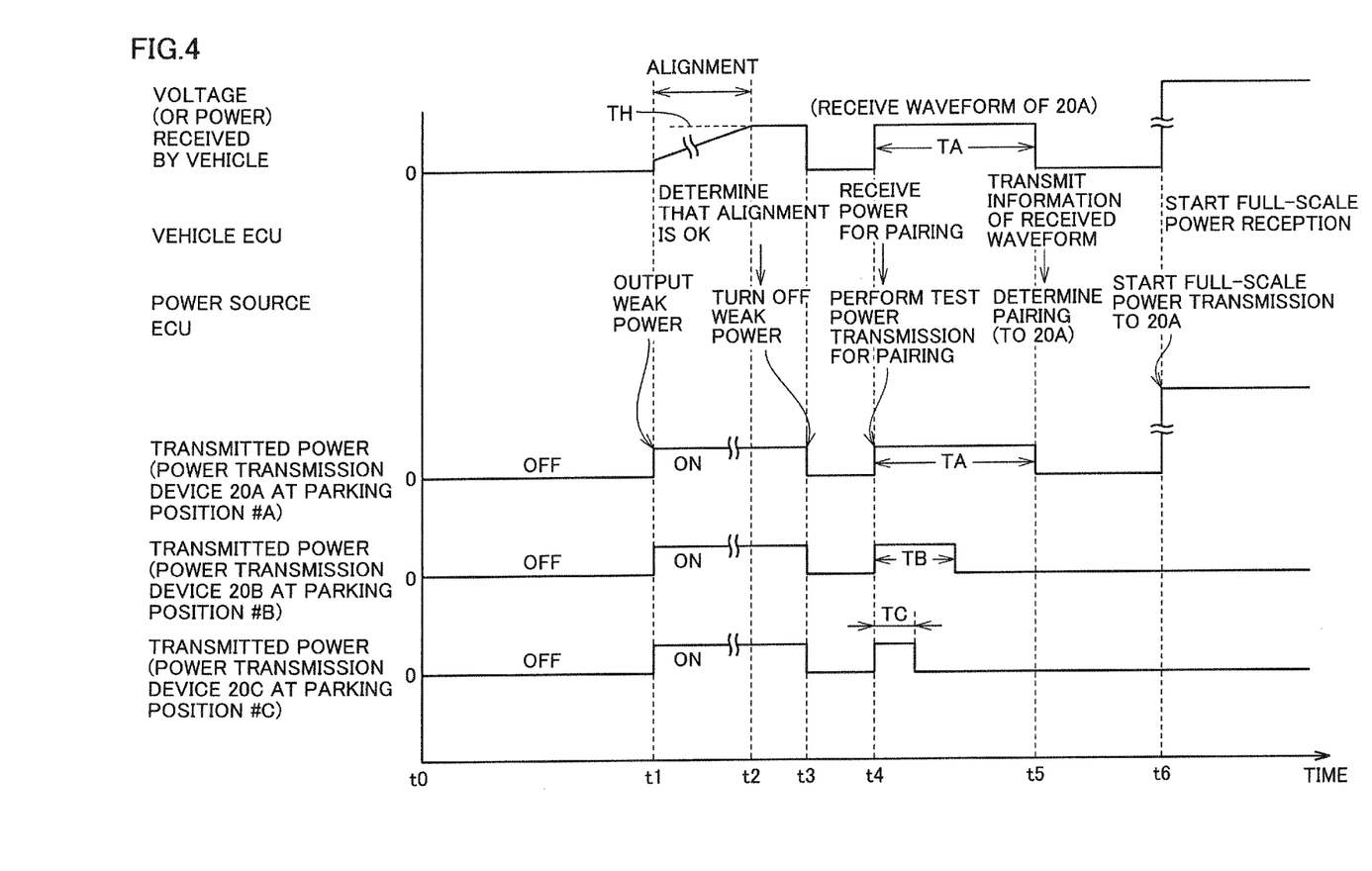
FIG. 4 is a timing chart illustrating changes in transmitted power and received voltage which change in the course of the processing in FIG. 3.

FIG. 3 is a flowchart for describing an outline of processing performed by vehicle 10 and charging station 90 when non-contact electric power transmission is performed. FIG. 4 is a timing chart illustrating changes in transmitted power and received voltage which change in the course of the processing in FIG. 3.

Referring to FIGS. 1, 3, and 4, in charging station 90, when there is a vacant parking slot (power transmission device) in step S500, the processing proceeds to step S510.

In vehicle 10, when the driver sets a non-contact charging switch 501 to ON in step S10, the processing proceeds to step S20.

Figure 5:
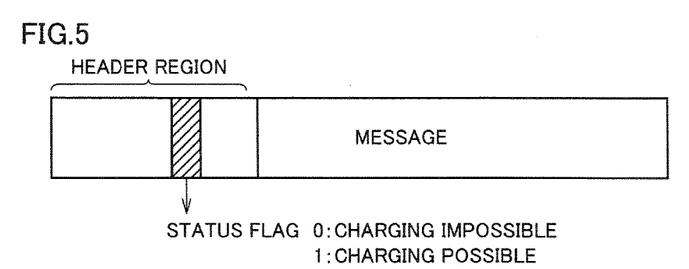
FIG. 5 is a view showing a charging possible message and a charging impossible message.

In step S510, power source ECU 800 repeats broadcast transmission of a charging possible message as shown in FIG. 5 at predetermined time intervals, to inform vehicle 10 that charging at charging station 90 is possible, via communication device 810. A status flag in a header region of the charging possible message is set to "1" indicating that charging is possible.

It is noted that, when there is no vacant parking slot in charging station 90, power source ECU 800 transmits a charging impossible message informing that charging is impossible because charging station 90 is full, via communication device 810, although not shown. As shown in FIG. 5, a status flag in a header region of the charging impossible message is set to "0" indicating that charging is impossible (charging station 90 is full).

In step S20, vehicle ECU 500 receives the charging possible message, via communication device 510.

In step S30, vehicle ECU 500 transmits a request for weak power transmission for the alignment, via communication device 510.

In step S520, power source ECU 800 receives the request for weak power transmission, via communication device 810.

In step S530, in charging station 90, power transmission devices 20A, 20B, 20C perform weak power transmission for the alignment with power reception device 120.

In step S40, vehicle 10 performs the alignment by moving vehicle 10 automatically or manually (see a time point t1 in FIG. 4). During the alignment, vehicle ECU 500 causes relay 202 to be conductive, and obtains the magnitude of received voltage VR generated across resistor 201 detected by voltage sensor 203. Since this voltage is smaller than the voltage at the time of full-scale power transmission, vehicle ECU 500 sets relay 210 to an OFF state so as not to be influenced by power storage device 300 at the time of detection.

When the magnitude of received voltage VR exceeds a threshold value TH, vehicle ECU 500 informs the driver that the alignment is successful, through notification device 520. Thereafter, when the driver presses a parking switch within vehicle 10 to inform that the parking position is all right, the processing proceeds to step S50 (see a time point t2 in FIG. 4). Here, a primary-side voltage (output voltage from power transmission device 20A, 20B, 20C) is constant, whereas a secondary-side voltage (received voltage VR) changes in accordance with a distance between the primary coil of power transmission device 20A, 20B, 20C and the secondary coil of power reception device 120. Thus, the relation between received voltage VR and a difference in horizontal position between a center of gravity O1 of a core of the primary coil and a center of gravity O2 of a core of the secondary coil is measured beforehand, and received voltage VR with respect to an acceptable value of the difference in horizontal position between center of gravity O1 of the core of the primary coil and center of gravity O2 of the core of the secondary coil is set as threshold value TH.

In step S50, vehicle ECU 500 transmits a request to stop the weak power transmission, via communication device 510.

In step S540, power source ECU 800 receives the request to stop the weak power transmission, via communication device 810, and thus the weak power transmission for the alignment performed by power transmission devices 20A, 20B, 20C is finished (see a time point t3 in FIG. 4).

In step S60 and step S550, vehicle ECU 500 and power source ECU 800 perform pairing processing specifying with which of power transmission devices 20A, 20B, 20C the alignment is performed.

Power source ECU 800 sets a different duration time for which the transmitted power is ON, for each power transmission device. That is, power transmission device 20A sets the transmitted power to ON for a time TA, power transmission device 20B sets the transmitted power to ON for a time TB, and power transmission device 20C sets the transmitted power to ON for a time TC (see a time point t4 in FIG. 4).

Vehicle ECU 500 informs power source ECU 800 of a duration time for which received power is ON, via communication device 510. In the example of FIG. 4, power reception device 120 receives the transmitted power from power transmission device 20A. Vehicle ECU 500 informs power source ECU 800 that the duration time for which the received power is ON is TA. Thereby, power source ECU 800 recognizes that the alignment is performed with power transmission device 20A.

In step S560, power source ECU 800 transmits a power transmission device number, via communication device 810, to specify the power transmission device (20A, 20B or 20C) with which vehicle 10 is aligned.

In step S70, vehicle ECU 500 receives the power transmission device number, via communication device 510.

In step S570, charging station 90 performs full-scale power transmission processing, through the power transmission device (20A, 20B or 20C) with which the alignment is performed (see a time point t6 in FIG. 4). In the example of FIG. 4, power transmission device 20A performs the power transmission processing.

In step S80, vehicle 10 performs full-scale power reception processing through power reception device 120, and charges power storage device 300 with the received power.

(Full-Scale Power Reception Processing and Full-Scale Power Transmission Processing)

Figure 6:
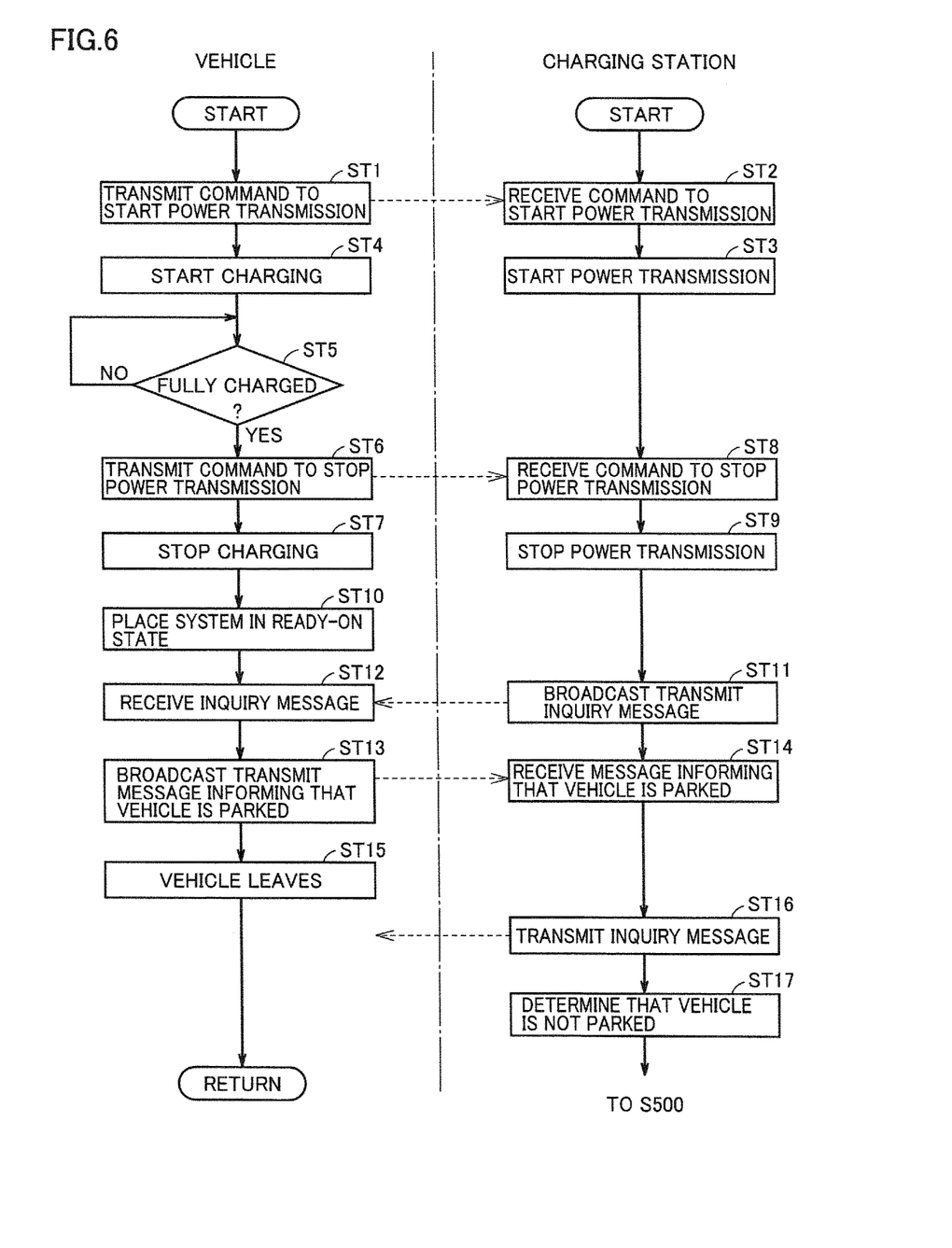
FIG. 6 is a flowchart illustrating details of full-scale power reception processing and full-scale power transmission processing in a first embodiment.

FIG. 6 is a flowchart illustrating details of the full-scale power reception processing in step S80 and the full-scale power transmission processing in S570 of FIG. 3.

Referring to FIG. 6, in step ST1, vehicle ECU 500 transmits a command to start power transmission, via communication device 510. In step ST2, power source ECU 800 receives the command to start power transmission, via communication device 810.

In step ST3, power source ECU 800 starts power transmission. In step ST4, vehicle ECU 500 starts charging.

When power storage device 300 is fully charged or charged to a predetermined amount in step ST5, the processing proceeds to step ST6.

In step ST6 and step ST7, vehicle ECU 500 transmits a command to stop the power transmission via communication device 510, and vehicle ECU 500 stops the charging. In steps ST8 and ST9, power source ECU 800 receives the command to stop the power transmission via communication device 810, and power source ECU 800 stops the power transmission.

When a power switch not shown is operated in step ST10, system main relay (SMR) 310 between power storage device 300 and motive power generation device 400 is turned on, placing vehicle 10 in a travelable state (i.e., placing a vehicle system in a Ready-ON state).

Figure 7:
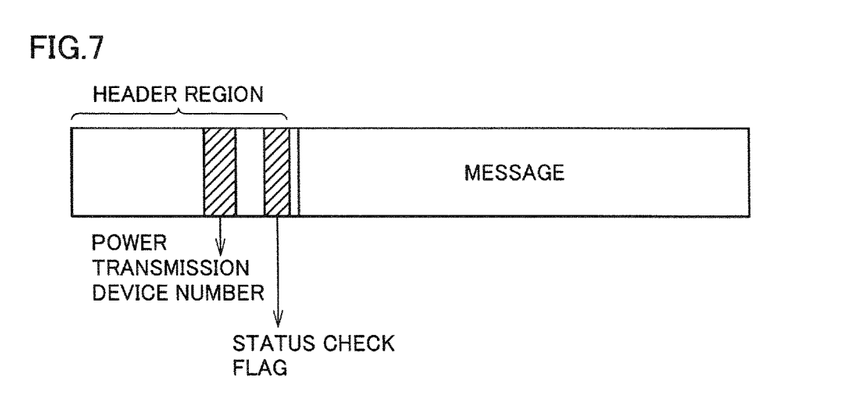
FIG. 7 is a view showing an inquiry message.

In step ST11, power source ECU 800 broadcast transmits an inquiry message as shown in FIG. 7, via communication device 810. A header region of the inquiry message includes a power transmission device number and a status check flag. In the present embodiment, it is assumed that the range in which the inquiry message can be received is set to a narrow region in the vicinity of locations provided with power transmission devices 20A, 20B, 20C, and that the inquiry message cannot be received if vehicle 10 leaves the parking slot (parking slot A in the example of FIG. 4).

In step ST12, vehicle ECU 500 receives the inquiry message, via communication device 510. Vehicle ECU 500 compares the power transmission device number included in the header region of the received inquiry message, with the power transmission device number received after the pairing processing is completed (see step S70 of FIG. 3), and thereby determines whether or not the inquiry is made for the power transmission device paired with power reception device 120 of the vehicle. The following steps are those of the processing performed when the inquiry is made for the power transmission device (power transmission device 20A in the example of FIG. 4) paired with power reception device 120 of the vehicle.

Figure 8:
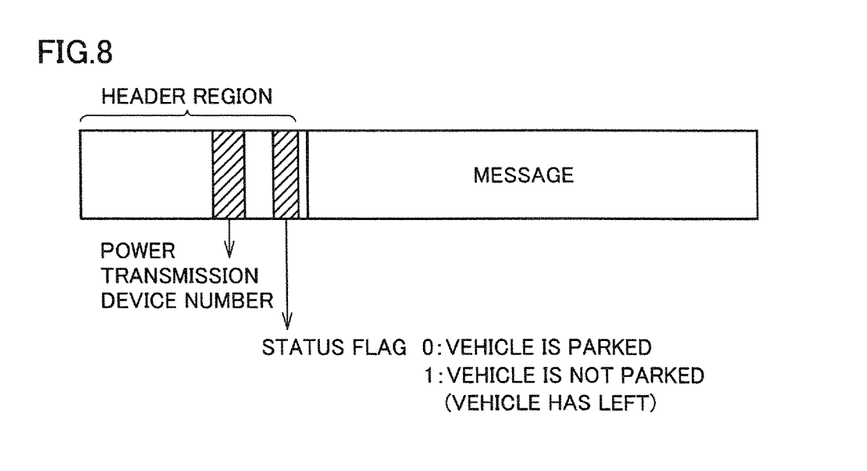
FIG. 8 is a view showing a message informing that the vehicle is parked and a message informing that the vehicle has left.

In step ST13, when vehicle 10 is parked at the location provided with the power transmission device (power transmission device 20A in the example of FIG. 4) paired with power reception device 120 of the vehicle, vehicle ECU 500 broadcast transmits a message informing that the vehicle is parked as shown in FIG. 8, via communication device 510. A header region of the message informing that the vehicle is parked includes a power transmission device number and a status flag set to "0" indicating that the vehicle is parked.

In step ST14, power source ECU 800 receives the message informing that the vehicle is parked, via communication device 810.

In step ST15, vehicle 10 leaves the parking slot (parking slot A in the example of FIG. 4), and in step ST16, power source ECU 800 broadcast transmits an inquiry message again, via communication device 810.

In step ST17, power source ECU 800 does not receive a message informing that the vehicle is parked, and thus power source ECU 800 determines that vehicle 10 is not parked at the location provided with the paired power transmission device (power transmission device 20A in the example of FIG. 4). This is because vehicle 10 has left the parking slot (parking slot A in the example of FIG. 4), and thus cannot receive the inquiry message. Thereafter, the processing returns to step S500 of FIG. 3.

When there is an already vacant parking slot (power transmission device) in the charging station, power source ECU 800 continues to transmit a charging possible message via communication device 810. When power source ECU 800 determines in step ST17 that the vehicle is not parked at the location provided with the power transmission device (power transmission device 20A in the example of FIG. 4), and thereby a vacant parking slot (parking slot A in the example of FIG. 4) is obtained after a fully parked state, power source ECU 800 stops transmission of a charging impossible message and starts transmission of a charging possible message.

As described above, according to the present embodiment, the charging station transmits, to the vehicle, a message inquiring whether or not the vehicle is parked at the location provided with the power transmission device, and the vehicle responds to the inquiry message. Thereby, the charging station can determine whether or not the power transmission device is vacant.

Second Embodiment

In a second embodiment, vehicle 10 transmits a message informing leaving of vehicle 10 which informs that vehicle 10 is not parked, to charging station 90, when vehicle 10 leaves a parking slot, that is, a location provided with power transmission device 20A, 20B, 20C, instead of responding to the inquiry from charging station 90 asking whether or not vehicle 10 is parked.

Figure 9:
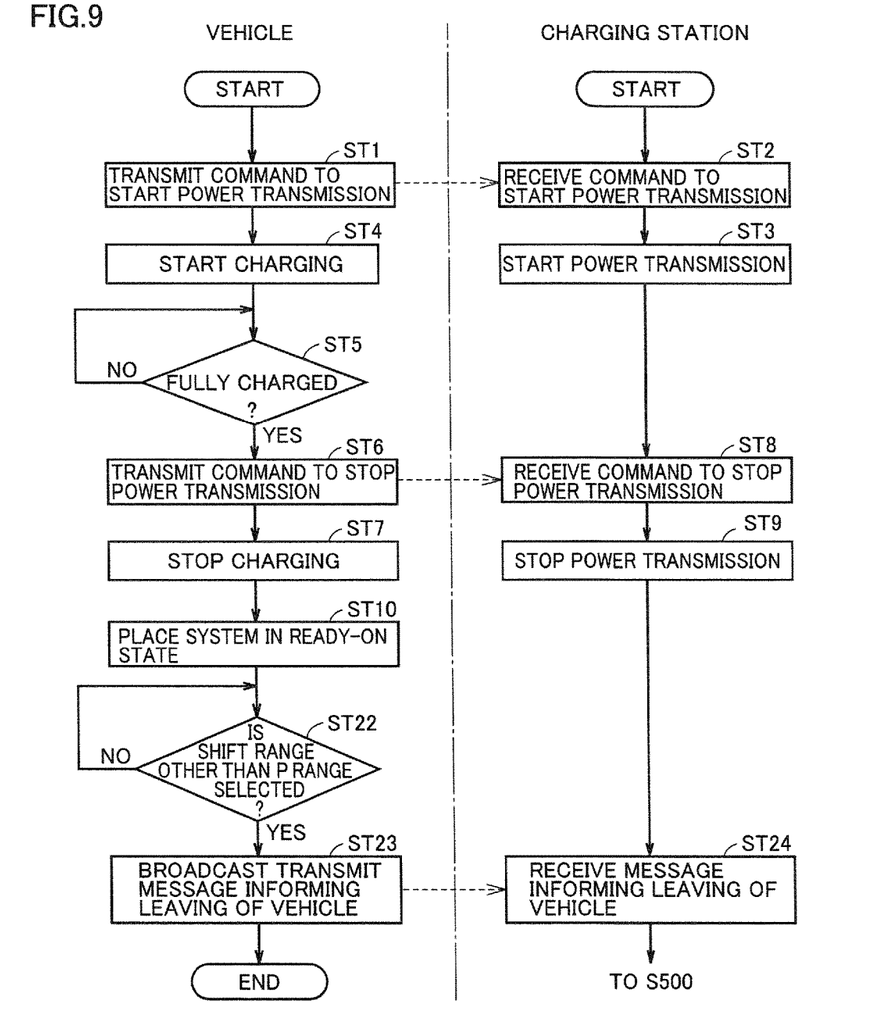
FIG. 9 is a flowchart illustrating details of full-scale power reception processing and full-scale power transmission processing in a second embodiment.

FIG. 9 is a flowchart illustrating details of full-scale power reception processing and full-scale power transmission processing in the second embodiment.

Referring to FIG. 9, in step ST1, vehicle ECU 500 transmits a command to start power transmission, via communication device 510. In step ST2, power source ECU 800 receives the command to start power transmission, via communication device 810.

In step ST3, power source ECU 800 starts power transmission. In step ST4, vehicle ECU 500 starts charging.

When power storage device 300 is fully charged or charged to a predetermined amount in step ST5, the processing proceeds to step ST6.

In step ST6 and step ST7, vehicle ECU 500 transmits a command to stop the power transmission via communication device 510, and vehicle ECU 500 stops the charging. In steps ST8 and ST9, power source ECU 800 receives the command to stop the power transmission via communication device 810, and power source ECU 800 stops the power transmission.

When a power switch not shown is operated in step ST10, system main relay (SMR) 310 between power storage device 300 and motive power generation device 400 is turned on, placing vehicle 10 in a travelable state (i.e., placing the vehicle system in a Ready-ON state).

When the driver selects a shift range other than a P range serving as a parking range in step ST22, the processing proceeds to step ST23. Examples of the shift range other than the P range include a B range (for a steep downward slope), an S range (for upward and downward slopes), a D range (for ordinary traveling) serving as travel ranges, an R range serving as a reverse range, an N range serving as a neutral range, and the like.

In step ST23, vehicle ECU 500 broadcast transmits a message informing leaving of the vehicle which informs that the vehicle is not parked as shown in FIG. 8, via communication device 510. A header region of the message informing leaving of the vehicle includes a power transmission device number and a status flag set to "1" indicating that the vehicle has left.

In step ST24, power source ECU 800 receives the message informing leaving of the vehicle, via communication device 810. Thereby, power source ECU 800 determines that vehicle 10 is not parked at the location provided with the paired power transmission device (power transmission device 20A in the example of FIG. 4). Thereafter, the processing returns to step S500 of FIG. 3, as in the first embodiment.

As described above, according to the present embodiment, when the vehicle leaves the location provided with the power transmission device, the vehicle transmits, to the charging station, a message of leaving of the vehicle. Thereby, the charging station can determine whether or not the power transmission device is vacant.

Third Embodiment

In a third embodiment, when vehicle 10 receives an inquiry from charging station 90 asking whether or not vehicle 10 is parked, if vehicle 10 is parked at a location provided with the power transmission device, vehicle 10 transmits, to charging station 90, a message informing that the vehicle is parked, and if vehicle 10 leaves the location provided with the power transmission device, vehicle 10 transmits, to charging station 90, a message informing leaving of the vehicle.

Figure 10:
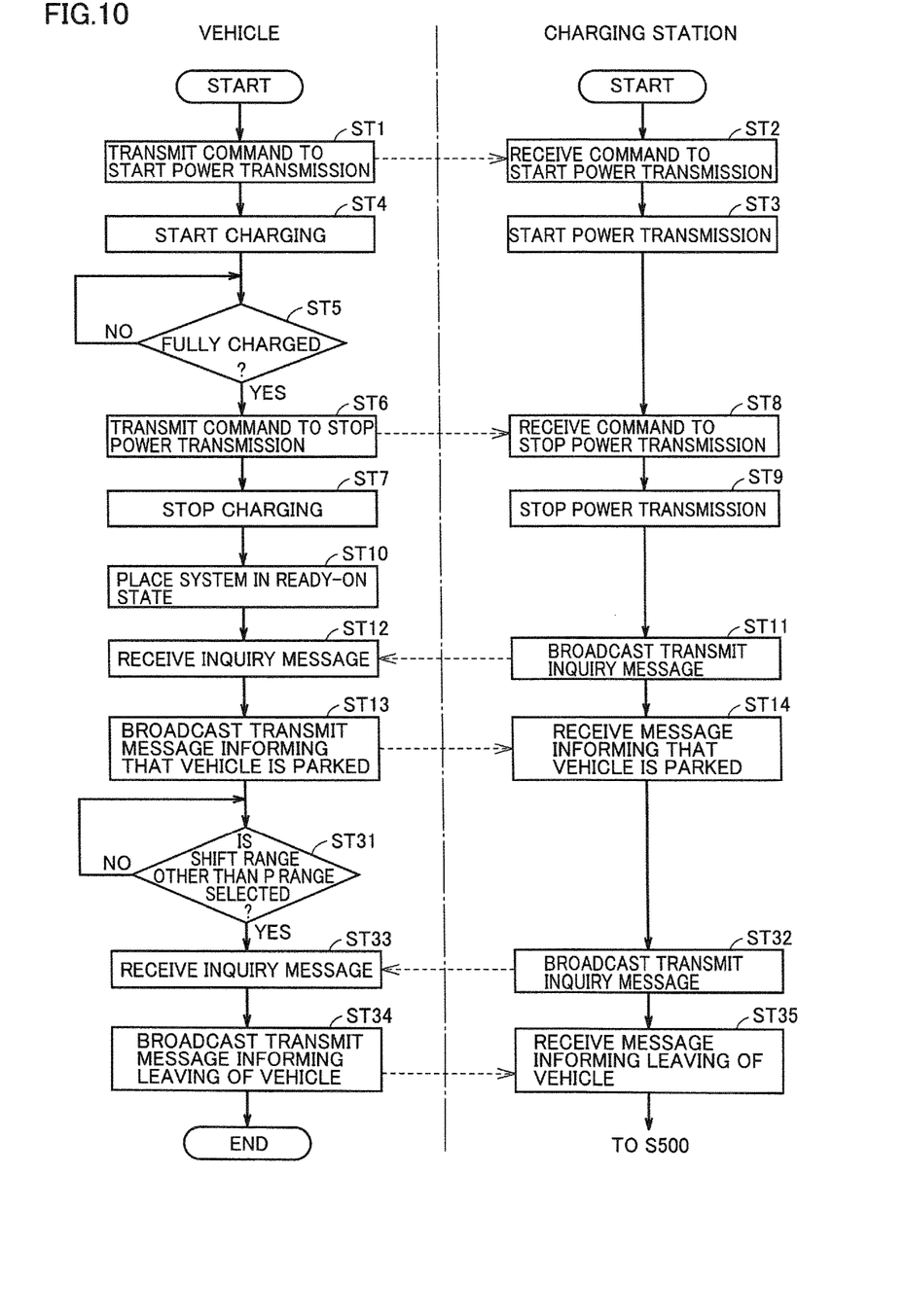
FIG. 10 is a flowchart illustrating details of full-scale power reception processing and full-scale power transmission processing in a third embodiment.

FIG. 10 is a flowchart illustrating details of full-scale power reception processing and full-scale power transmission processing in the third embodiment.

Referring to FIG. 10, in step ST1, vehicle ECU 500 transmits a command to start power transmission, via communication device 510. In step ST2, power source ECU 800 receives the command to start power transmission, via communication device 810.

In step ST3, power source ECU 800 starts power transmission. In step ST4, vehicle ECU 500 starts charging.

When power storage device 300 is fully charged or charged to a predetermined amount in step ST5, the processing proceeds to step ST6.

In step ST6 and step ST7, vehicle ECU 500 transmits a command to stop the power transmission via communication device 510, and vehicle ECU 500 stops the charging.

In steps ST8 and ST9, power source ECU 800 receives the command to stop the power transmission via communication device 810, and power source ECU 800 stops the power transmission.

When a power switch not shown is operated in step ST10, system main relay (SMR) 310 between power storage device 300 and motive power generation device 400 is turned on, placing vehicle 10 in a travelable state (i.e., placing the vehicle system in a Ready-ON state).

In step ST11, power source ECU 800 broadcast transmits an inquiry message as shown in FIG. 7, via communication device 810.

In step ST12, vehicle ECU 500 receives the inquiry message, via communication device 510. Vehicle ECU 500 compares the power transmission device number included in the header region of the received inquiry message, with the power transmission device number received after the pairing processing is completed (see step S70 of FIG. 3), and thereby determines whether or not the inquiry is made for the power transmission device as a power transmission source paired with its power reception device. The following steps are those of the processing performed when the inquiry is made for the power transmission device as the power transmission source paired with its power reception device.

In step ST13, when vehicle 10 is parked at a location provided with the power transmission device as the power transmission source paired with its power reception device, vehicle ECU 500 broadcast transmits a message informing that the vehicle is parked as shown in FIG. 8, via communication device 510.

In step ST14, power source ECU 800 receives the message informing that the vehicle is parked, via communication device 810.

When the driver selects a shift range other than the P range serving as the parking range in step ST31, the processing proceeds to the next step.

In step ST32, power source ECU 800 broadcast transmits an inquiry message as shown in FIG. 7, via communication device 810.

In step ST33, vehicle ECU 500 receives the inquiry message, via communication device 510.

In step ST34, vehicle ECU 500 broadcast transmits a message informing leaving of the vehicle which informs that the vehicle is not parked as shown in FIG. 8, via communication device 510.

In step ST35, power source ECU 800 receives the message informing leaving of the vehicle, via communication device 810.

As described above, according to the present embodiment, when there is an inquiry from the charging station asking whether or not the vehicle is parked, if the vehicle leaves the location provided with the power transmission device, a message of leaving of the vehicle is transmitted to the charging station. Thereby, the charging station can determine whether or not the power transmission device is vacant.

The present invention is not limited to the embodiments described above, and also includes, for example, variations as described below.

(1) Transmission of a Message Informing Leaving of the Vehicle

Although a message informing leaving of the vehicle is transmitted when the driver selects a shift range other than the P range serving as the parking range after the charging is finished in the second and third embodiments, the present invention is not limited thereto. For example, the vehicle may transmit a message informing leaving of the vehicle when a vehicle speed exceeds a predetermined speed, when a value obtained by summating the vehicle speed exceeds a predetermined value, or when the current position of vehicle 10 obtained from a GPS (Global Positioning System) system is away from charging station 90 by a predetermined distance or more.

(2) Processing made by Specifying a Vacant Power Transmission Device

Further, since power source ECU 800 of the charging station can recognize which power transmission device becomes vacant when power source ECU 800 does not receive a message informing that the vehicle is parked in response to an inquiry message, and when power source ECU 800 receives a message informing leaving of the vehicle, power source ECU 800 may be configured, for example, to guide the vehicle to a parking slot provided with the vacant power transmission device.

(3) Determination that the Vehicle is Not Parked

Power source ECU 800 transmits a charging impossible message when there is no vacant parking slot (power transmission device) in the charging station. Power source ECU 800 can determine that there is no vacant parking slot (power transmission device) in the charging station, as described below.

In the first embodiment, power source ECU 800 determines, for each of power transmission devices 20A, 20B, 20C, that vehicle 10 is parked, from after completion of pairing to when power source ECU 800 determines that it does not receive a message informing that the vehicle is parked. When power source ECU 800 determines, for all of power transmission devices 20A, 20B, 20C, that vehicle 10 is parked, power source ECU 800 determines that there is no vacant parking slot (power transmission device) in the charging station.

In the second and third embodiments, power source ECU 800 determines, for each of power transmission devices 20A, 20B, 20C, that vehicle 10 is parked, from after completion of pairing to when power source ECU 800 receives a message informing leaving of the vehicle. When power source ECU 800 determines, for all of power transmission devices 20A, 20B, 20C, that vehicle 10 is parked, power source ECU 800 determines that there is no vacant parking slot (power transmission device) in the charging station.

(4) Pairing

The pairing processing in step S60 and step S550 of FIG. 3 is not limited to the processing described above. For example, power source ECU 800 sets a different cycle of switching between ON and OFF of the transmitted power, for each power transmission device. That is, power transmission device 20A switches between ON and OFF of the transmitted power at every cycle dTA, power transmission device 20B switches between ON and OFF of the transmitted power at every cycle dTB, and power transmission device 20C switches between ON and OFF of the transmitted power at every cycle dTC. Vehicle ECU 500 informs power source ECU 800 of the cycle of switching between ON and OFF of the received power. For example, when power reception device 120 receives the transmitted power from power transmission device 20A, vehicle ECU 500 informs power source ECU 800 that the cycle of switching between ON and OFF of the received power is dTA. Thereby, power source ECU 800 recognizes that the alignment is performed with power transmission device 20A.

The embodiments disclosed herein are also intended to be implemented in combination as appropriate. In addition, it should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

10: vehicle; 20A, 20B, 20C: power transmission device; 90: charging station; 100: power reception unit; 120: power reception device; 150, 610A, 610B, 610C: filter circuit; 200: rectification unit; 201: resistor; 202, 210: relay; 203: voltage sensor; 300: power storage device; 400: motive power generation device; 500: vehicle ECU; 510, 810: communication device; 520: notification device; 600A, 600B, 600C: power source unit; 700A, 700B, 700C: power transmission unit; 800: power source ECU; 900: external power source.

The invention claimed is:

1. A non-contact electric power transmission system transmitting electric power between a vehicle and a charging station in a non-contact manner,
the charging station comprising:
a plurality of power transmission devices configured to transmit the electric power in the non-contact manner;
a station control unit configured to transmit a first message for inquiring whether or not the vehicle is parked at a location provided with one of the power transmission devices, after charging is completed;
the vehicle comprising:
a power reception device configured to receive the electric power in the non-contact manner; and
a vehicle control unit configured to transmit a second message for informing that the vehicle is parked, when receiving the first message,
when alignment between one of the plurality of power transmission devices and the power reception device is completed, the vehicle control unit being configured to perform pairing processing between the vehicle and the charging station, the pairing processing being performed for causing the charging station to specify with which of the plurality of power transmission devices the power reception device is aligned,
after the pairing processing is completed, the vehicle control unit being configured to receive from the charging station information for specifying the power transmission device with which the alignment is performed,
the first message including the information for specifying the power transmission device,
when a transmission device specified by the information received after the pairing processing corresponds to a transmission device specified by the first message received, the vehicle control unit being configured to transmit the second message including the received information for specifying the power transmission device,
when the station control unit does not receive the second message after transmitting the first message, the station control unit being configured to determine that the vehicle is not parked at the location provided with the one of the plurality of power transmission devices.

2. The non-contact electric power transmission system according to claim 1, wherein, when the station control unit does not receive the second message, the station control unit is configured to transmit a third message informing that charging at the charging station is possible.

3. The non-contact electric power transmission system according to claim 2, wherein the second message includes the received information for specifying the power transmission device, and information indicating that the vehicle is parked.

4. The non-contact electric power transmission system according to claim 3, wherein, in the pairing processing, the plurality of power transmission devices transmit electric power for different intervals within a predetermined period, and the vehicle control unit sends a signal indicating a reception interval during which the power reception device receives the electric power.

5. The non-contact electric power transmission system according to claim 3, wherein
the station control unit determines that each of the plurality of power transmission devices is occupied by a vehicle when the station control unit does not receive the second message after completion of the pairing processing, and
the station control unit issues a fourth message indicating that the charging station is full and unavailable for charging.

* * * * *